Patented Feb. 4, 1930

1,745,465

UNITED STATES PATENT OFFICE

WALTER ZISCH, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK

PROCESS OF MAKING OXYGEN PREPARATIONS

No Drawing. Application filed January 31, 1929, Serial No. 336,631, and in Germany January 30, 1928.

This invention is a continuation in part of my copending application S. N. 230,929, filed Nov. 3, 1927.

In S. N. 230,929 there is described the process for the manufacture of oxygen preparations suitable for use in breathing apparatus. That process consists in exposing an alkali metal peroxide or a peroxide mixture to the action of water in finely divided form while cooling and stirring the peroxide, and it is recommended that not essentially more than about 9 parts of water be used with 100 parts of peroxide. This is to prevent any undesired decomposition of the preparation which would cause a comparatively quick decrease in the quantity of oxygen that would be set free by the action of the carbonic acid and moisture contained in the air after it had been breathed.

After thorough investigation, I have now found that the reason for the above mentioned undesirable decomposition lies in the fact that during the introduction of water the content of hydrate water increases in some parts of the peroxide mass to a value above the limit at which the hydrated peroxide is yet stable. This occurs in spite of the stirring of the reaction mixture.

On the basis of this knowledge, I have found that I can observe certain precautions which will enable me to use more than the ratio of 9 parts of water to 100 parts of peroxide without fear of decomposition. By thoroughly mixing the materials, using finely divided peroxide, and slowly introducing the water in a sufficiently finely divided state I have been able to produce a uniform distribution of the water onto the peroxide without exceeding the upper limit of water at which the troublesome decomposition would occur. In this way I have been able to use satisfactorily, up to 23 parts of water for each 100 parts of peroxide and in some cases even more than 23 parts. In general, I have found it advisable to work with 10 to 15 parts of water per 100 parts of peroxide. By properly carrying out my process, the hydrating reaction takes place smoothly without the production of harmful conditions which would cause a change in the oxide preparation being formed, as for example, by causing it to spontaneously give up its oxygen.

The hydrating reaction may be carried out by contacting the water in the form of a spray, vapor, snow or the like with the peroxide being used, taking care at the same time to cause the most thorough mixing of the reactants. I prefer to mix the reacting materials in suitable mixing apparatus, such as a rotating drum or tube or the like, while providing for the quick and complete removal of the heat of hydration which is produced. The desired fine division and thorough mixing of the peroxide with the water can be produced by scattering finely pulverized peroxide into an atmosphere containing water or treating peroxide powder with a current of water in the form of a spray or with a current of air which carries water vapor.

The more voluminous and the finer the peroxide particles the more suitable they are for hydration by my method. As in S. N. 230,929, the activity of a preparation made by this invention is improved by having catalysts for the liberation of oxygen present during manufacture, such as oxygen compounds of iron, manganese, etc. particularly the oxides.

What I claim is:

1. Process for the production of oxygen preparations for purifying air comprising thoroughly mixing pulverized alkali metal peroxide with less than about 23 parts by weight of water in finely divided state per 100 parts of peroxide at a low temperature.

2. Process for the production of oxygen preparations for purifying air comprising thoroughly mixing pulverized alkali metal peroxide with about 10 to 15 parts by weight of water in finely divided state per 100 parts of peroxide at a low temperature.

3. Process for the production of oxygen preparations for purifying air comprising thoroughly mixing pulverized alkali metal peroxide with less than about 23 parts by weight of water in finely divided state per 100 parts of peroxide at a low temperature, and providing for the presence of an oxide of the group comprising iron and manganese.

4. Process for the production of oxygen preparations for purifying air comprising thoroughly mixing pulverized alkali metal peroxide with less than about 23 parts by weight of water in finely divided state per 100 parts of peroxide at a low temperature and in the presence of an oxide of the group comprising iron and manganese.

5. Process for the production of oxygen preparations for purifying air comprising thoroughly mixing pulverized alkali metal peroxide with less than about 23 parts by weight of water in finely divided state per 100 parts of peroxide at a low temperature and dusting the product obtained with an oxide of the group comprising iron and manganese.

Signed at Frankfort-on-the-Main, Germany, this 10th day of January, A. D., 1929.

WALTER ZISCH.